United States Patent [19]
Gauchel et al.

[11] Patent Number: 5,747,075
[45] Date of Patent: May 5, 1998

[54] APPARATUS FOR RESIN IPREGNATED PULTRUSION

[75] Inventors: James V. Gauchel; Richard N. Lehman, both of Newark, Ohio

[73] Assignee: Owens-Corning Fiberglas Technology Inc., Summit, Ill.

[21] Appl. No.: 476,812

[22] Filed: Jun. 7, 1995

[51] Int. Cl.[6] .................................................... B29C 70/52
[52] U.S. Cl. .......................... 425/114; 156/433; 156/441; 264/137
[58] Field of Search ........................ 156/180, 181, 156/166, 441, 433; 425/114; 264/136, 137

[56] References Cited

U.S. PATENT DOCUMENTS

| | | |
|---|---|---|
| 2,628,401 | 2/1953 | Fielder . |
| 3,523,331 | 8/1970 | Weeks . |
| 3,524,222 | 8/1970 | Gregory et al. . |
| 3,556,888 | 1/1971 | Goldsworthy . |
| 4,046,103 | 9/1977 | Yakuboff . |
| 4,154,563 | 5/1979 | Johnson . |
| 4,481,056 | 11/1984 | Kuhl . |
| 4,515,737 | 5/1985 | Karino et al. . |
| 4,521,363 | 6/1985 | Vogel . |
| 4,681,722 | 7/1987 | Carter et al. . |
| 4,755,127 | 7/1988 | Becker . |
| 4,810,429 | 3/1989 | Mayr . |
| 4,820,366 | 4/1989 | Beever et al. . |
| 4,883,690 | 11/1989 | Carter . |
| 5,073,413 | 12/1991 | Koppernacs et al. . |
| 5,120,380 | 6/1992 | Strachan . |
| 5,268,050 | 12/1993 | Azari ........................ 156/180 |
| 5,310,600 | 5/1994 | Tsuya et al. ................ 264/136 |
| 5,324,377 | 6/1994 | Davies . |
| 5,407,616 | 4/1995 | Dube . |
| 5,492,583 | 2/1996 | Fingerson et al. ............ 156/180 |

FOREIGN PATENT DOCUMENTS

| | | |
|---|---|---|
| 49-24173 | 6/1974 | Japan . |
| 1186514 | 1/1988 | Japan . |
| 262377 | 5/1970 | U.S.S.R. ................... 425/114 |
| 943151 | 6/1960 | United Kingdom . |
| 1206946 | 9/1970 | United Kingdom ............ 156/180 |
| 2143770 | 2/1985 | United Kingdom . |

OTHER PUBLICATIONS

"A Method for Producing Ladder Rail Using High Pressure Injection Die Impregnation"; OC Pub. No. 1-PL-19592, Jan. 1995.
Abstract for PCT WO93/24297; Dec. 2, 1993.
Abstract for SU 761,291; Nov. 10, 1980.

*Primary Examiner*—Geoffrey L. Knable
*Attorney, Agent, or Firm*—C. Michael Gegenheimer; Inger H. Eckert

[57] ABSTRACT

A method and apparatus for resin injected pultrusion is provided. The method comprises injecting a resin material into a reinforcement pack at a sufficiently high pressure such that the pressure in the injection area or weir of the injection die is substantially equal to the compression pressure applied by the exit portion of the injection die. An apparatus for achieving the method is also provided.

21 Claims, 7 Drawing Sheets

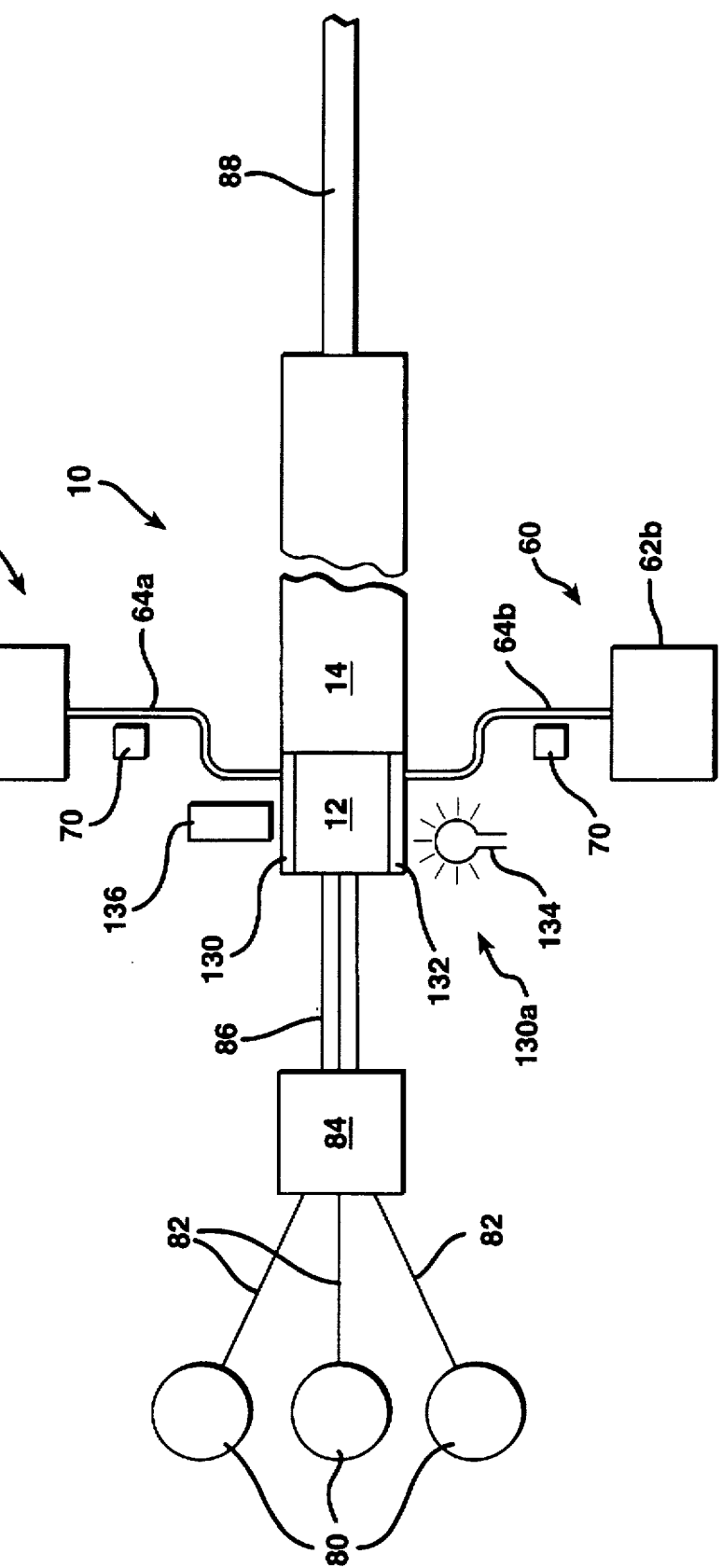

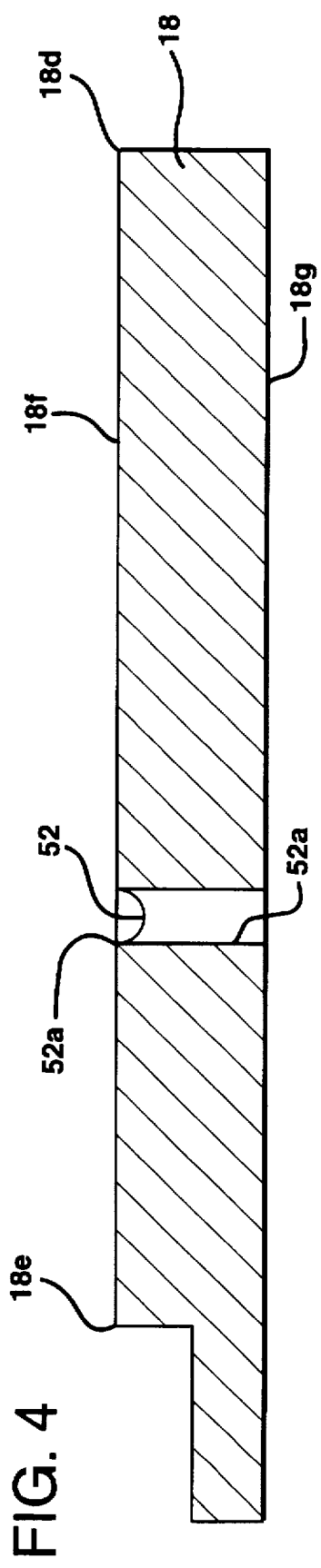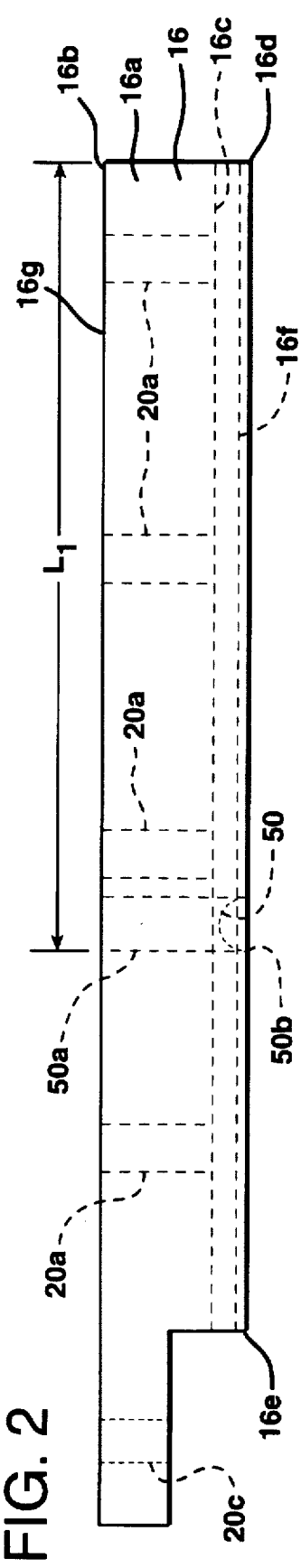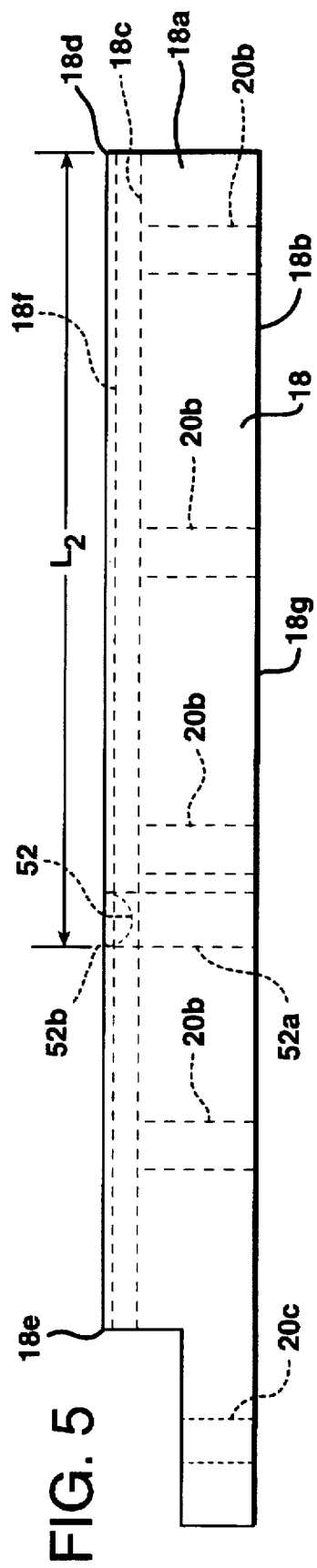

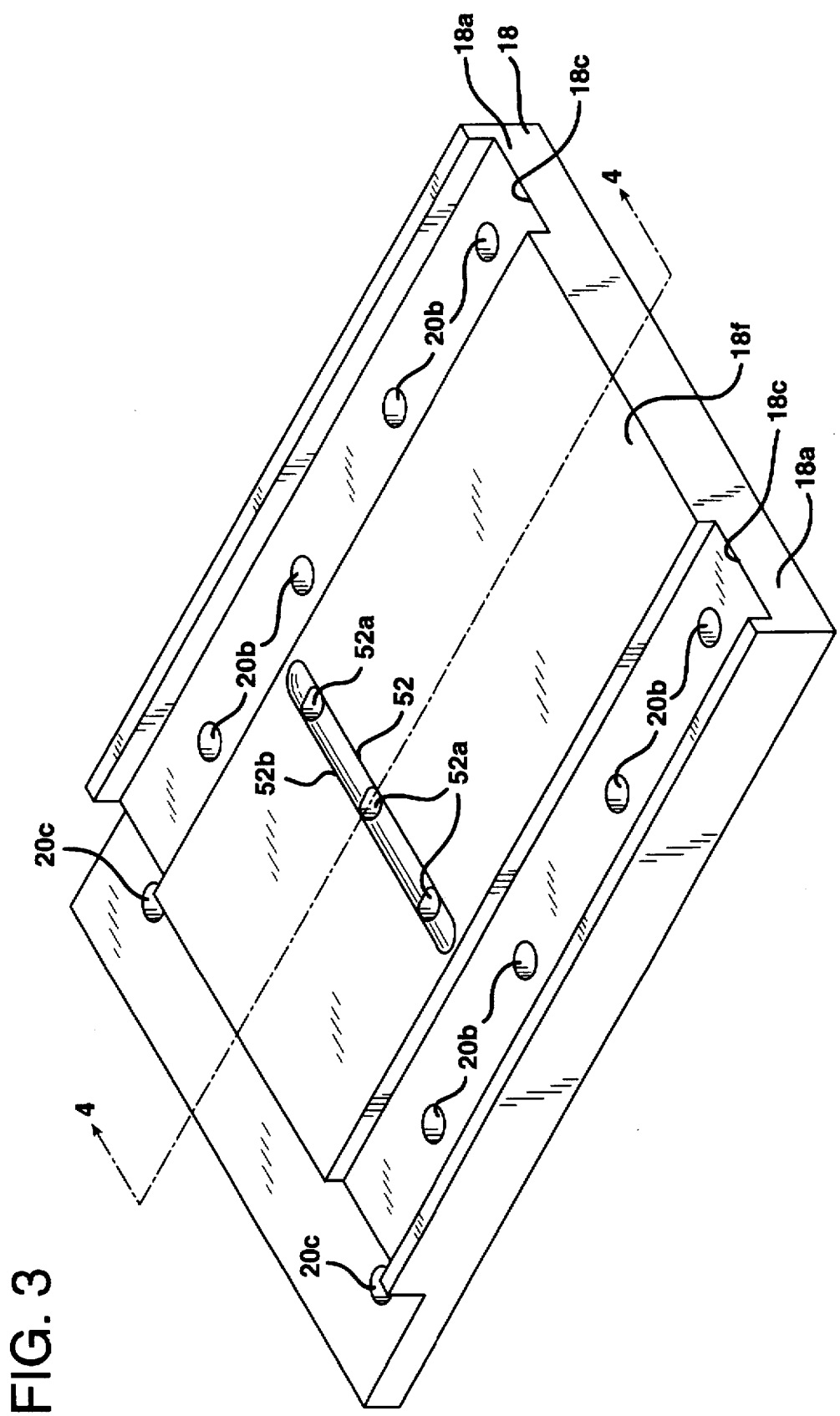

APPARATUS FOR RESIN IPREGNATED PULTRUSION

CROSS REFERENCE TO RELATED APPLICATION

This application is related to contemporaneously filed U.S. patent application Ser. N. 08/474,755, titled "A Method and System for Producing Pultruded Parts," by Robert I. Werner et al., having attorney docket number RD-75, incorporated by reference herein; and is related to contemporaneously filed U.S. patent application Ser. No. 08/474,276, titled "Method and Apparatus for Monitoring Resin Injection Pultrusion," by Gauchel et al., having attorney docket number 23731A incorporated by reference herein.

BACKGROUND OF THE INVENTION

The present invention relates in general to resin injected pultrusion and, more particularly, to an improved resin injection die and methods for performing resin injected pultrusion.

Pultrusion of resin impregnated fibers, such as mineral or glass fibers, is well known. Generally, pultrusion of resin impregnated fibers involves impregnating a multitude of continuous fibers and/or continuous fiber/mat combinations with a suitable resin material and passing the impregnated fibers through a die. Traditionally, the continuous fibers were impregnated by passing the fibers through a bath of liquid resin material, thereby completely wetting or coating the fibers in the resin material. The coated fibers were then consolidated and passed through a pultrusion or cure die where the fibers were formed into a desired shaped and the resin material cured to fix the fibers in place.

However, the resin baths of these prior art processes have several significant drawbacks. Resin baths, as operated in the prior art, resulted in an undue amount of waste of resin material thereby increasing operating expenses. Further, as tanks were employed to hold the resin materials, a large quantity of both time and expense were required to change from one particular resin material to a different type of resin material.

In addition, resin materials, for the most part, comprise blends of organic compounds, a significant portion of which are volatile organic compounds or VOC's. The emission of VOC's is strictly monitored and limited by various governmental agencies and regulations. Compliance with the regulations can become quite expensive. Resin baths, as employed in the prior art impregnation processes, are open or partially open to the atmosphere and involve the use of large quantities of resin materials. The level of VOC emissions in these prior art processes is much larger than desired.

As a result of the drawbacks to the use of a resin bath to impregnate continuous fibers, resin injection as a means for impregnating continuous fibers in a pultrusion process has been utilized for a number of years. The resin injection process consists of replacing the resin bath and any wet preform stations that may be employed with a machined cavity in a die. As dry fiber is fed through the die and into the cavity, resin is injected such that the fibers are coated with resin material.

U.S. Pat. No. 5,073,413 to Koppernacs et al. discloses a typical prior art resin injection apparatus. Referring to FIG. 3 of the '413 patent, a reinforcement comprising fibers 2 and cloth 6 enter an injection die and are passed into a teardrop-shaped cavity 52 where resin material is injected. The fibers and resin material pass into a tapered portion of the cavity where the combination is rapidly compressed. Unfortunately, some reinforcement packs, especially those having low permeability layers, may not be fully impregnated. This results, it is believed, because the fiber layers are not sufficiently compressed at the point where resin is injected to permit sufficient resin pressure and flow to fully impregnate the fibers. Also, it is believed that the resin pressure along the entire length of the cavity is not sufficiently high to effect complete impregnation of the reinforcement pack. Accordingly, the final pultruded product may have a higher level of voids, i.e., areas in the product in which no resin is present, than desired. Such voids in the final product lead to weak points which result in unsatisfactory performance.

U.S. Pat. No. 3,556,888 to Goldsworthy also discloses a prior art resin injection means. Goldsworthy discloses a composing tube having a tapered entrance through which fibers are passed and resin is injected to impregnate the fibers. Goldsworthy does not disclose a teardrop-shaped cavity in the composing tube as in the '413 patent. Rather, Goldsworthy injects resin into the fibers in the tapered entrance of the composing tube. Furthermore, Goldsworthy separates the composing tube from the curing die. Between the composing tube and curing die, Goldsworthy exposes the impregnated fibers to the atmosphere without being under compression. During this exposure, the fibers may separate such that air is allowed to permeate back into the reinforcement pack creating voids. Thus, Goldsworthy does not reduce the presence of voids.

Accordingly, a need remains for an apparatus for resin impregnated pultrusion wherein tightly compressed bundles of fibers may be completely impregnated and the presence of voids in the final pultruded product reduced.

SUMMARY OF THE INVENTION

This need is met by the present invention wherein an improved resin injection die and methods for performing resin injected pultrusion are provided. The injection die is configured having a shallow tapered entry portion or wedge. The die also includes one or more injection ports positioned such that resin material is introduced under high pressure at a point near one of the areas of highest pressure within the die. At this point, fiber layers of a pultrusion reinforcement pack are in a very compressed state. Hence, it is less likely that resin will travel along the interfaces between low and high permeability layers of the reinforcement pack and, instead will travel completely through the low permeability layers to fully impregnate the innermost layers of the pack. The injection die is coupled to a curing die at the curing die's entrance such that an air-tight seal is formed between the two structures. This seal prevents air from becoming entrapped in the pultruded part which can result in voids being formed in the part.

In accordance with a first aspect of the present invention, an apparatus for resin injected pultrusion is provided. The apparatus comprises an injection die having a first die body with an inlet end for receiving a pultrusion reinforcement pack and an outlet end for discharging the reinforcement pack. The injection die also includes a second die body having an inlet end for receiving the pultrusion reinforcement pack and an outlet end for discharging the reinforcement pack. The first die body and the second die body are coupled to one another by, for example, shim rails, to define a passage therebetween. The passage extends from the inlet ends of the first and second die bodies to the outlet ends of the first and second die bodies.

The first and second die bodies also define a resin injection weir positioned between their respective inlet ends and outlet ends. At least one of the first and second die bodies has at least one port for injecting resin into the weir. The passage includes an entrance portion extending from the inlet ends of the first and second bodies to the weir and an exit portion extending from the weir to the outlet ends of the first and second die bodies. The pressure in the weir is substantially constant across its width and along its length.

The apparatus also includes injection apparatus communicating with the port for injecting resin into the weir to impregnate the reinforcement pack. Preferably, the resin is injected at a sufficiently high pressure such that the pressure in the weir is substantially equal to a compression pressure applied by the exit portion of the passage to the impregnated reinforcement pack. However, it is also contemplated that the pressure in the weir may be higher than the compression pressure applied by the exit portion of the passage.

The resin injection weir may be shaped so as to create a uniform pressure profile across the injection die thereby minimizing lateral motion of the fibers in the reinforcement pack. The weir is preferably defined by a channel formed in at least one of the first die body and the second die body substantially perpendicularly to the passage. More preferably, the weir is defined by a channel formed in each of the first and second die bodies substantially perpendicular to the passage. Preferably, each of the first and second die bodies includes a port for injecting resin into the weir. Alternatively, each of the first and second die bodies may include two or more ports for injecting resin into the weir.

The entrance portion of the passage may be tapered from the inlet ends of the die bodies to the weir. Preferably, the taper defines an angle of about 1° or less. More preferably, the taper defines an angle of about 0.5° or less. The apparatus preferably includes a curing die sealingly associated with the injection die or integrally formed with the injection die. The injection apparatus may include a heating device for heating the resin before it is injected into the weir. Also, the injection apparatus may include a mixing head for mixing an uncatalyzed resin precursor and a catalyzed resin precursor to form a resin for injection into the weir.

In accordance with a second aspect of the present invention, a method for performing resin injected pultrusion is provided. The method comprises the steps of forming a pultrusion product continuous reinforcement pack for entry into a resin injection die, passing the reinforcement pack into the resin injection die and injecting resin into the weir of the resin injection die to thoroughly impregnate the reinforcement pack with resin.

The injection die includes an inlet portion, an outlet portion and a resin injection weir positioned between the inlet portion and the outlet portion. Preferably, the resin is injected at a sufficiently high pressure such that the pressure in the weir is substantially equal to a compression pressure applied at the outlet portion of the injection die to the resin impregnated reinforcement pack. However, it is also contemplated that the pressure in the weir may be higher than the compression pressure applied by the exit portion of the passage.

The method preferably includes the further steps of curing the resin impregnated reinforcement pack in a curing die sealingly associated with the resin injection die or integrally formed with the resin injection die and compressing the reinforcement pack in the inlet portion of the resin injection die. The step of injecting resin into the weir may include the step of creating a uniform pressure profile across the resin injection die so as to minimize lateral motion of components of the reinforcement pack. The step of resin injection may include the step of creating a predefined length of fully impregnated reinforcement pack in the inlet portion of the resin injection die. The length of the fully impregnated reinforcement pack may be adjusted by varying the inlet pressure of the resin.

The method may also include the step of heating the resin before it is injected into the weir. A further step may comprise mixing an uncatalyzed resin precursor and a catalyzed resin precursor to form the resin for injection into the weir.

Accordingly, it is an object of the present invention to provide an improved resin injection die which is capable of fully impregnating a reinforcement pack with resin material. It is further an object of the present invention to provide an improved resin injection die having a tapered entry portion which terminates at a resin injection weir. It is another object of the present invention to provide an improved high pressure resin injected die for use in forming a resin injected pultrusion. It is still another object of the present invention to provide improved methods for performing resin injected pultrusion.

BRIEF DESCRIPTION OF THE DRAWINGS

FIG. 1 is a schematic view of apparatus operable in accordance with the present invention;

FIG. 2 is a side view of a first die body forming part of the injection die of the present invention;

FIG. 3 is a perspective view of a second die body forming part of the injection die of the present invention;

FIG. 4 is a cross-sectional side view of the second die body of FIG. 3 taken along section line 4—4;

FIG. 5 is a side view of the second die body of FIG. 3;

DETAILED DESCRIPTION OF THE PREFERRED EMBODIMENTS

Figure 6A:
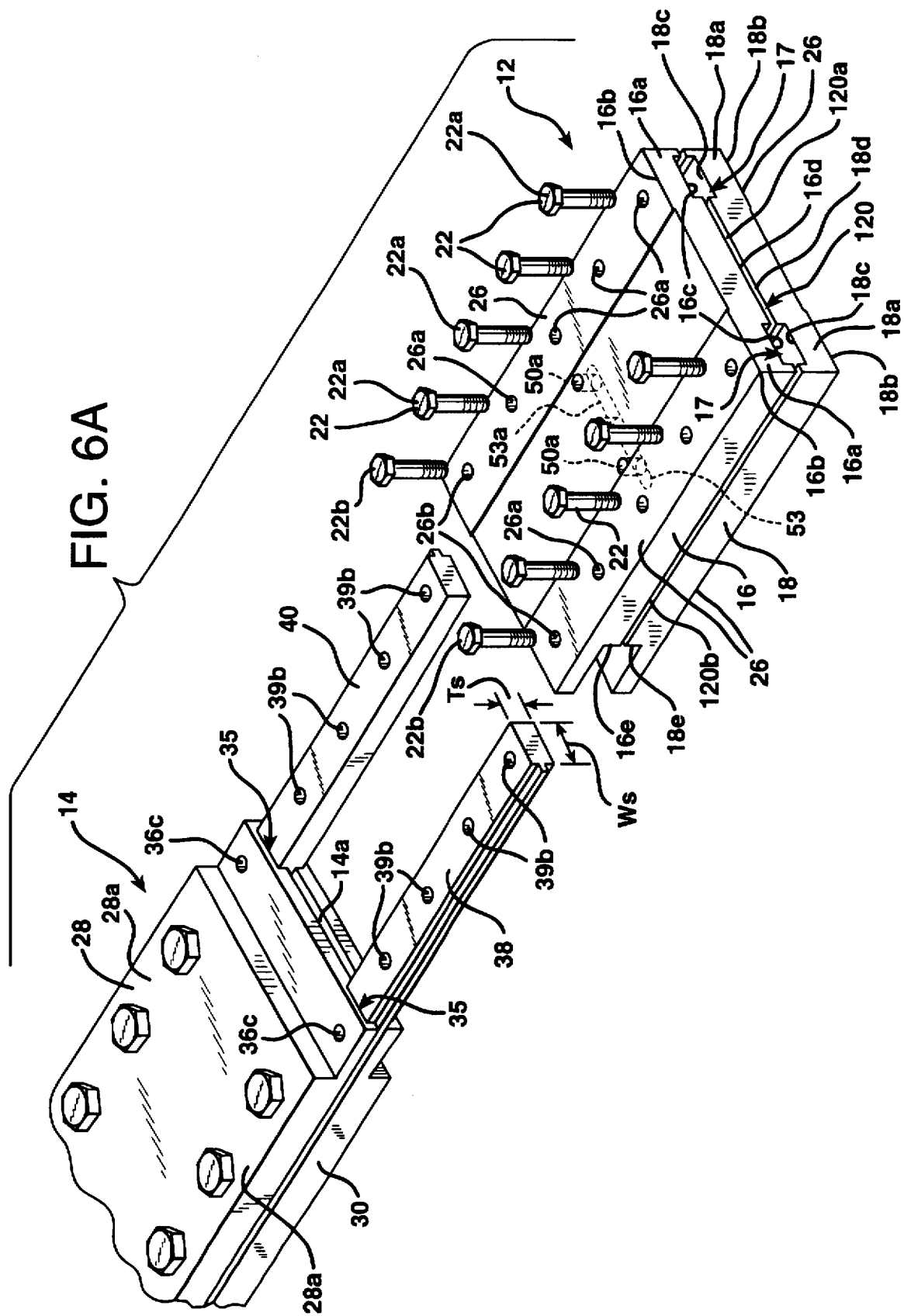
FIG. 6A is a perspective view of an injection die and curing die of the present invention uncoupled from one another.

FIG. 1 shows schematically an apparatus 10 constructed in accordance with the present invention for forming a pultruded product 88 as well as the flow of materials into and through the apparatus 10. The apparatus 10 includes a high pressure injection die 12 which receives a reinforcement pack 86 and resin material and acts to fully impregnate the reinforcement pack 86 with the resin material. The injection die 12 is capable of fully impregnating reinforcement packs 86 having one or more low permeability layers which, heretofore, were not capable of being fully impregnated by injection dies. A curing die 14 is sealingly coupled to or integrally formed with the injection die 12 and defines a curing chamber 14a through which the impregnated reinforcement pack passes under compression to allow the resin material to cure, see FIG. 6A. Cooling apparatus may be associated with the injection die 12 to prevent premature curing of the resin material and heating and/or cooling apparatus may be associated with the curing die 14 to maintain the proper curing temperature for the resin being injected. A variety of such heating and cooling apparatus and associated thermal insulation material are well known in the art.

Spools 80 of reinforcement materials 82, such as glass or polymer fibers, rovings or bundles of fibers, continuous filament mats, fiber or polymer cloths, or veil, are located upstream from the injection die 12. While only three spools 80 are illustrated, more or less may be provided. The reinforcement materials 82 are pulled from the spools 80 and, in the illustrated embodiment, pass through a conventional shaping die 84 which properly aligns the reinforcement materials 82 relative to one another and compresses the materials 82 to form the reinforcement pack 86.

While not shown in the drawings, one or more conventional carding plates may be positioned between the spools 80 and the shaping die 84 for locating the reinforcement materials in a desired orientation and defining the shape of the resulting reinforcement pack 86. Further, a conventional forming/tensioning mechanism (not shown) may be located between the spools 80 and the forming cards to apply tension to the reinforcement materials to prevent undesirable movement or shifting of the materials and help maintain the proper positioning of the materials. Conventional pulling means (not shown) is provided downstream from the curing die 14 for pulling the reinforcement materials 82 from the spools 80 and through the dies 84, 12 and 14.

It is further contemplated that a preimpregnation station (not shown) may be employed to preimpregnate one or more layers of the reinforced material, typically the center layers. Such a station may be required if a highly viscous resin material is used. However, the resin applied by the preimpregnation system must still allow air to exit the injection die 12, i.e., the reinforcement pack including the preimpregnated layers must not close off the entrance into the injection die 12.

Referring now to FIGS. 2–5, the injection die 12 comprises first and second die bodies 16 and 18, respectively, which may be formed from a metal or other appropriate material. In the illustrated embodiment, the entire first and second die bodies 16 and 18 are formed from a generally clear polymeric material, such as a methyl acrylate plastic for example a methyl methacrylic acid, for monitoring or observing the injection pultrusion process. It is also contemplated that portions of the die bodies 16 and 18 may be formed from a clear polymeric material for monitoring purposes and the remaining portions from a metal. The first die body 16 is provided with a plurality of apertures 20a spaced along its outer longitudinal edge portions 16a, see FIG. 2. The apertures 20a are adapted to receive fasteners, such as bolts 22, which extend through apertures 20b provided in the second die body 18 along its outer longitudinal edge portions 18a and threadedly engage nuts (not shown). Galvanized plates 26, shown in FIG. 6A, are interposed between outer surface sections 16b of the first die body 16 and heads 22a of the bolts 22 and outer surface sections 18b of the second die body 18 and the nuts which threadedly engage the bolts 22. Openings 26a are provided in the plates 26 and are spaced and sized to correspond to the apertures 20a and 20b for allowing the bolts 22 to pass therethrough.

The first die body 16 is further provided with two inner recesses 16c which are positioned opposite to two inner recesses 18c provided in the second die body 18 and, as will be discussed further below, define shim rail receiving channels 17.

Figure 6B:
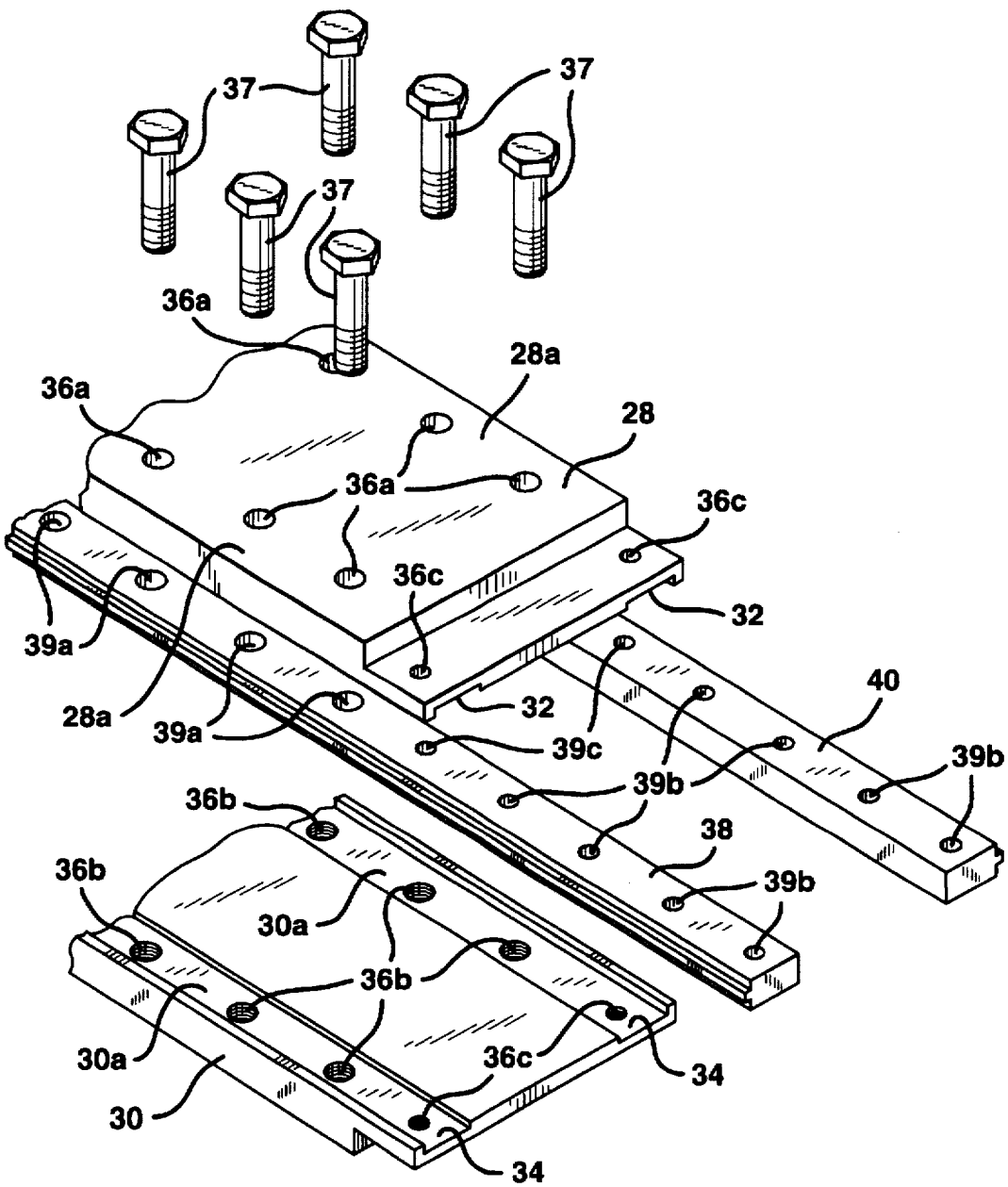
FIG. 6D is an exploded view of the curing die of FIG. 6A.

The curing die 14 comprises first and second die sections 28 and 30, respectively, which, in the illustrated embodiment, are formed from an appropriate metal. A plurality of first apertures 36a are spaced along the outer longitudinal edge portions 28a of the first die section 28 and receive fasteners, such as bolts 37, which threadedly engage threaded apertures 36b spaced along the outer longitudinal edge portions 30a of the second die section 30, see FIGS. 6A and 6B.

Two first inner recesses 32 are provided in the first die section 28 and two second inner recesses 34 are provided in the second die section 30 which are positioned opposite to the first recesses 32 when the first die section 28 and the second die section 30 are positioned for assembly to form the curing die 14. Each set of first and second inner recesses 32 and 34 defines a receiving channel 35 for one of first and second shim rails 38 and 40. The first and second shim rails 38 and 40 are provided with a plurality of first bores 39a which are sized and spaced to correspond to the apertures 36a and 36b provided in the first and second die sections 28 and 30. Hence, each bolt 37 extends through an aperture 36a in the first die section 28, through a bore 39a in one of the first and second shim rails 38 and 40 and threadedly engages an aperture 36b in the second die section 30 to couple the first and second die sections 28 and 30 and the first and second shim rails 38 and 40 together to form the curing die 14.

Extending through the entire length of the curing die 14 is the curing chamber 14a. The width and thickness of the curing chamber 14a is defined by the width $W_S$ and thickness $T_S$ of each of the shim rails 38 and 40 and the depth of the recesses 32 and 34 provided in the first and second die sections 28 and 30.

As noted above, the curing die 14 is sealingly coupled to or integrally formed with the injection die 12. This prevents air from reaching the impregnated reinforcement pack prior to and during curing. As can be seen from FIG. 6A, the first and second shim rails 38 and 40 extend out from the first and second die sections 28 and 30 and are adapted to be received in one of the two channels 17 defined by sets of the first and second recesses 16c and 18c in the first and second die bodies 16 and 18. Second bores 39b in the shim rails 38 and 40 are sized and spaced to correspond to the apertures 20a and 20b provided in the first and second die bodies 16 and 18. Thus, each bolt 22 extends through an opening 26a in one of the plates 26, through an aperture 20a in the first die body 16, through a bore 39b in one of the first and second shim rails 38 and 40, through an aperture 20b in the second die body 18 and threadedly engages a nut (not shown). Bores 39c in the shim rails 38 and 40 are sized and spaced to correspond to apertures 26b in plates 26, apertures 20c in the first and second die bodies 16 and 18 and apertures 36c in the first and second die sections 28 and 30. Bolts 22b extend through apertures 26b in plates 26, apertures 20c in the first and second die bodies 16 and 18, apertures 36c in the first and second die sections 28 and 30 and bores 39c in the shim rails 38 and 40 and are threadedly received in nuts (not shown). By securing the bolts 22 and 22b in this manner, the first and second die bodies 16 and 18 and the first and second shim rails 38 and 40 are coupled together to form the injection die 12 and, further, the injection die 12 is sealingly coupled to the curing die 14.

It is also contemplated by the present invention that the first die body 16 may be integrally formed with the first die section 28 and the second die body 18 may be integrally formed with the second die section 30 and the integral first die body 16 and first die section 28 may be fastened to the integral second die body 18 and second die section 30.

The injection die 12 is provided with a passage 120 extending from inlet ends 16d and 18d of the first and second die bodies 16 and 18 to outlet ends 16e and 18e of the die bodies 16 and 18, see FIGS. 2, 4, 5, and 6A. While the passage 120 has a generally rectangular cross section in the illustrated embodiment, it may be C-shaped, I-shaped, L-shaped, circular or have some other cross sectional shape. The first and second die bodies 16 and 18 are respectively further provided with first and second channels 50 and 52 which extend transversely across generally the entire extent of the passage 120 and define a resin injection weir 53, see FIG. 7. Each of the first and second channels 50 and 52 is generally shaped as a semicircle in cross section, but other shapes could be used as well.

Three injection ports 50a are provided in the first body 16 and three injection ports 52a are provided in the second body 18 for communicating resin material from injection apparatus 60 to the weir 53, see FIGS. 2, 3 and 6A. Dependent upon the particular pultrusion being formed, resin may be injected through one, two or all three of the injection ports 50a and 52a. The resin material is injected by the injection apparatus 60 under high pressure to the weir 53 where it is laterally distributed across the passage 120. Because the first and second channels 50 and 52 extend transversely across generally the entire extent of the passage 120 and have semi-circular cross sections, the resin material, once it has flowed into the weir 53, moves outwardly from the weir 53 and longitudinally from the weir 53 toward the inlet ends 16d and 18d of the first and second die bodies 16 and 18 to fully impregnate the pack 86. Furthermore, the shape of the weir 53, as defined by the channels 50 and 52, and the location of the injection ports 50a and 52a are such that the weir 53 creates a generally uniform resin pressure profile transverse to the passage 120 so as to minimize lateral motion of fibers in the reinforcement pack 86.

Figure 7:
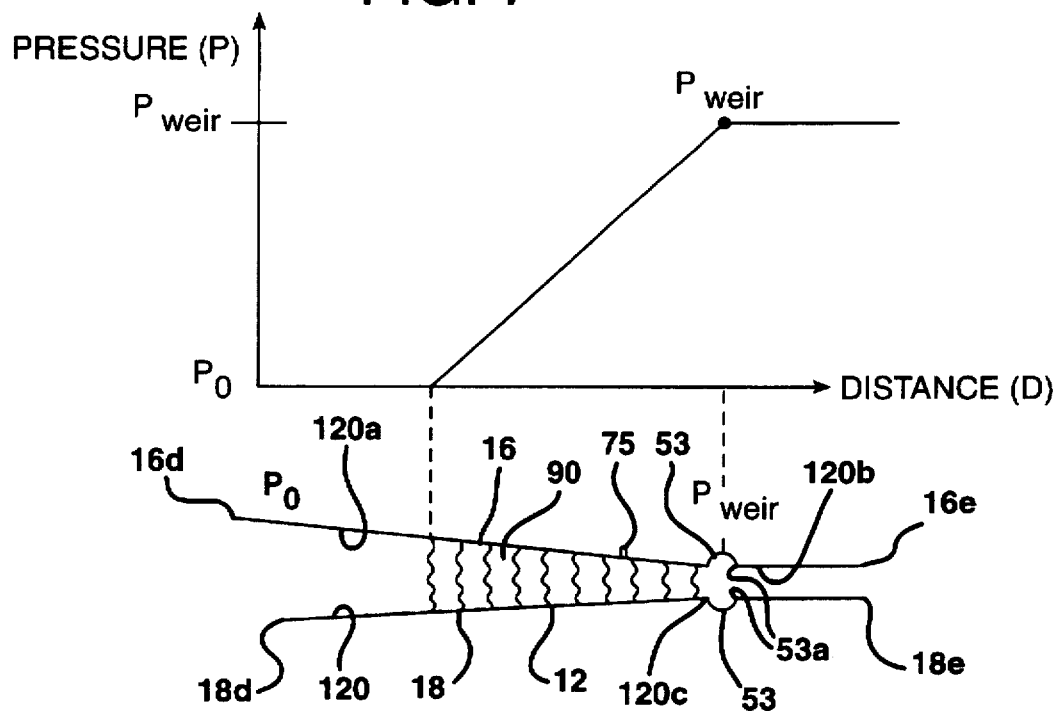
FIG. 7 is a schematic illustration of an injection die constructed in accordance with the present invention with a corresponding example graphical representation of pressure within such an injection die versus distance from the entrance portion of the injection die.

The passage 120 includes an entrance portion 120a extending from the inlet ends 16d and 18d of the first and second die bodies 16 and 18 to a backside 53a of the weir 53 and an exit portion 120b extending from the backside 53a of the weir 53 to the outlet ends 16e and 18e, see FIGS. 6A and 7. The entrance portion 120a is tapered or sloped from the inlet ends 16d and 18d of the first and second die bodies 16 and 18 to the backside 53a of the weir 53. That is, an inner surface 16f of the first die body 16 extending along distance $L_1$, e.g., 8 inches, from the inlet end 16d to a backside 50b of the first channel 50 and an inner surface 18f of the second die body 18 extending along distance $L_2$, e.g., 8 inches, from the inlet end 18d to the backside 52b of the second channel 52 is tapered or sloped toward the weir 53 such that the passage 120 steadily decreases in size as it nears the weir 53, as shown exaggerated in FIGS. 2 and 5.

Preferably, the total taper defined by the inner surfaces 16f and 18f along distances $L_1$ and $L_2$ is about 1° or less, more preferably less than about 0.5°, and most preferably less than about 0.25°. Thus, the distance between the inner surface 16f and an outer surface 16g of the first body 16 increases along distance $L_1$ from the inlet end 16d to the first channel 50 and the distance between the inner surface 18f and an outer surface 18g of the second body 18 increases along distance $L_2$ from the inlet end 18d to the second channel 52. The increase in the distance between the inner and outer surfaces 16f, 16g, 18f and 18g is preferably about 4.5 mils per inch, more preferably about 3.0 mils per inch, and most preferably about 1.5 mils per inch.

The exit portion 120b extending from the backside 53a of the weir 53 to the outlet ends 16e and 18e has generally constant transverse cross section along its entire extent. Further, the transverse cross section of the exit portion 120b is generally equal to or only slightly smaller than the cross section of the narrowest section 120c of the entrance portion 120a, see FIG. 7. Also, the transverse cross section of the exit portion 120b is generally equal to a transverse cross section of the curing chamber 14a taken at any location along the length of the curing die 14. Because the cross section of the exit portion 120b is substantially equal to the cross section of the curing chamber 14a, backflow of resin material into the curing die 14 is minimized.

With the entrance portion 120a of the passage 120 tapered as shown schematically in FIG. 7, the die bodies 16 and 18 act to gradually compress the reinforcement pack 86 as the pack 86 is drawn or pulled through the passage 120 from the entrance portion 120a to the weir 53. Thus, when the reinforcement pack 86 reaches the weir 53, it is sufficiently compressed to permit sufficient resin pressure and flow to fully impregnate the pack 86. Furthermore, the reinforcement pack 86 is sufficiently compressed while in the entrance portion 120a to prevent resin material from exiting the injection die 12 through the entrance portion 120a even though the resin material is injected under sufficient resin pressure for fully impregnating the pack.

Due to the shape of the weir 53 and the tapered entrance portion 120a, resin material injected into the injection die 12 has a very short residence time, i.e., it does not remain in the die 12 for a long period of time. As a result, resin materials having quick cure times may be used. This is a significant improvement over prior art processes which used resin baths since such processes were not capable of using resin materials having short cure times.

As noted above, the injection apparatus 60 injects resin material under high pressure to the injection ports 50a and 52a which in turn communicate the resin material to the weir 53. The injection apparatus 60 preferably injects the resin material into the weir 53 at a sufficiently high pressure such that the pressure in the weir is substantially equal to the pressure in the exit portion 120b, see FIG. 7. However, it is also contemplated that the pressure in the weir may be higher than the compression pressure applied by the exit portion of the passage. This allows the resin material to fully and completely penetrate the compressed reinforcement pack 86 before moving into the cure die 14. While not wishing to be bound by any fixed amount of pressure, the injection pressure of the resin material is on the order of 100 psi or greater, and more preferably on the order of 250 psi or greater.

Figure 9:
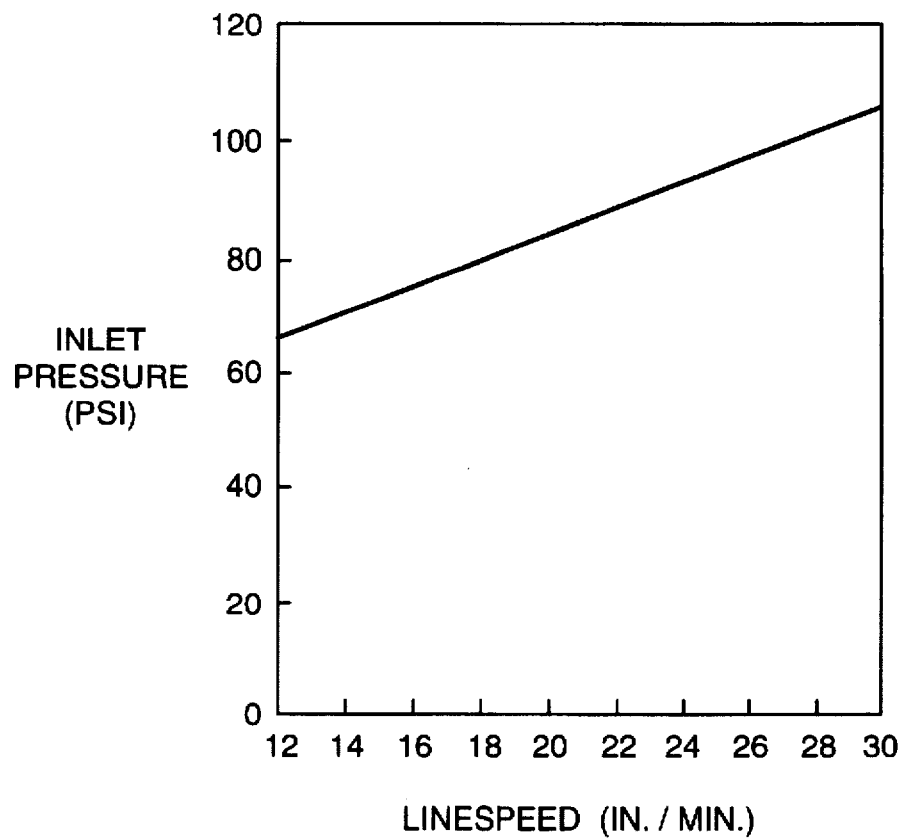
FIG. 9 is a graphical representation of inlet resin pressure versus linespeed for an injection die constructed in accordance with the present invention.

The injection of resin material into the weir 53 creates a zone of resin 90 which extends upstream from the weir 53 a certain distance as illustrated in FIG. 7. This resin zone 90 creates a length of fully impregnated reinforcement within the entrance portion 120a of the passage 120. The length of the zone 90 may be varied by adjusting the inlet pressure at which the resin material is injected into the weir 53. Preferably, about 3 to 6 inches of fully impregnated reinforcement is maintained in the entrance portion 120a of the passage 120. It has been found that the amount of inlet pressure required for full impregnation is proportional to line speed as is illustrated in FIG. 9. In the illustrated embodiment, a pressure sensor 75 is positioned approximately 4 inches upstream from the weir 53 to sense the pressure within the entrance portion 120a of the passage 120. The pressure sensed by the sensor 75 should be essentially constant at any line speed within a range of feasible line speeds and should not vary if the line speed is changed so long as the inlet pressure is changed to the appropriate pressure for that new line speed.

Injection apparatus 60 includes a resin supply device 62a and supply lines 64a for communicating resin material from the resin supply device 62a to one or more of the injection ports 50a and a resin supply device 62b and supply lines 64b which communicate resin material from the resin supply device 62b to one or more of the injection ports 52a. The supply devices 62a and 62b may comprise a mixing pot under pressure and a control valve which controls the flow of resin material from the mixing pot through one of the sets of supply lines 64a and 64b to the injection die 12. Alternatively, the supply devices 62a and 62b may comprise a resin material chamber, such as a multi-component mixing chamber, and any one of a number of conventional pumps, such as a double-action piston pump, for moving the resin material from the chamber, through one of the sets of supply lines 64a and 64b to the injection die 12. Any other conventional supply device may also be employed.

The number of resin materials which are capable of being used during operation of the injection die 10 of the present invention far exceed those capable of being used in prior art apparatuses such as those having resin baths. For example, resin materials having high viscosities which if used previously in injection dies would not have resulted in full impregnation can be used. Further, resin materials having short cure times may be used. In this instance, each of the supply devices 62a and 62b includes a multi-component mixing chamber which acts to mix at least one uncatalyzed component with at least one catalyzed component just prior to injecting the combined materials into the injection die 12.

In the illustrated embodiment, conventional heaters 70 are provided to heat the resin material and lower its viscosity before being injected into the injection die 12. The heaters 70 are located between the supply devices 62a and 62b and the injection die 12. If a multi-component mixing chamber is employed, the location of each heater 70 may be changed so that it heats only the uncatalyzed portion of the resin material prior to being mixed with the catalyzed portion.

Turning now to FIG. 7, while not wishing to be bound by any one particular theory of operation of the present invention, the operation of the present invention will be discussed. FIG. 7 includes a graphical representation of the pressure within the injection die 12 versus the distance from the entrance portion 120a of the passage 120. As can be seen, pressure is substantially atmospheric within the injection die 12 until the resin zone 90 is reached. Once the resin zone 90 is reached, the pressure increases substantially linearly with distance until a peak of pressure corresponding approximately to $P_{weir}$ is reached. It is at this point of maximum pressure within the injection die 12 that resin is injected in the present invention resulting in a pressure of approximately $P_{weir}$ along the entire length and entire width of the weir 53.

As previously mentioned, resin is preferably injected at a high enough pressure so that $P_{weir}$ is substantially equal to the pressure created within the exit portion 120b of the passage 120. As the reinforcement pack 86 approaches the weir 53, the largest portion of the air entrapped between the fibers or layers of the reinforcement pack 86 has been removed. Any remaining air is swept from the reinforcement pack 86 out the open end of the injection die 12 by the resin which extends into the reinforcement pack 86 to define the resin zone 90. Thus, by injecting resin at the high pressure approximately corresponding to $P_{weir}$, substantially all air within the reinforcement pack 86 is removed. Further, the resin is under such high pressure that it is able to fully penetrate the reinforcement pack 86, including any low permeability layers, and sufficient resin is provided to fully impregnate the reinforcement pack 86. The resin is able to be injected at such a sufficiently high pressure because the reinforcement pack 86 is subjected to substantially the same high pressure immediately adjacent to the weir 53 and thus the resin forms the resin zone 90 without being ejected from the open end of the injection die 12. Thus, voids are minimized and the reinforcement pack 86 is fully impregnated. In fact, the present invention produces a reinforcement pack having about 1%±1% voids in the nature of stress cracks or fractures rather than true gaps or voids.

Figure 8:
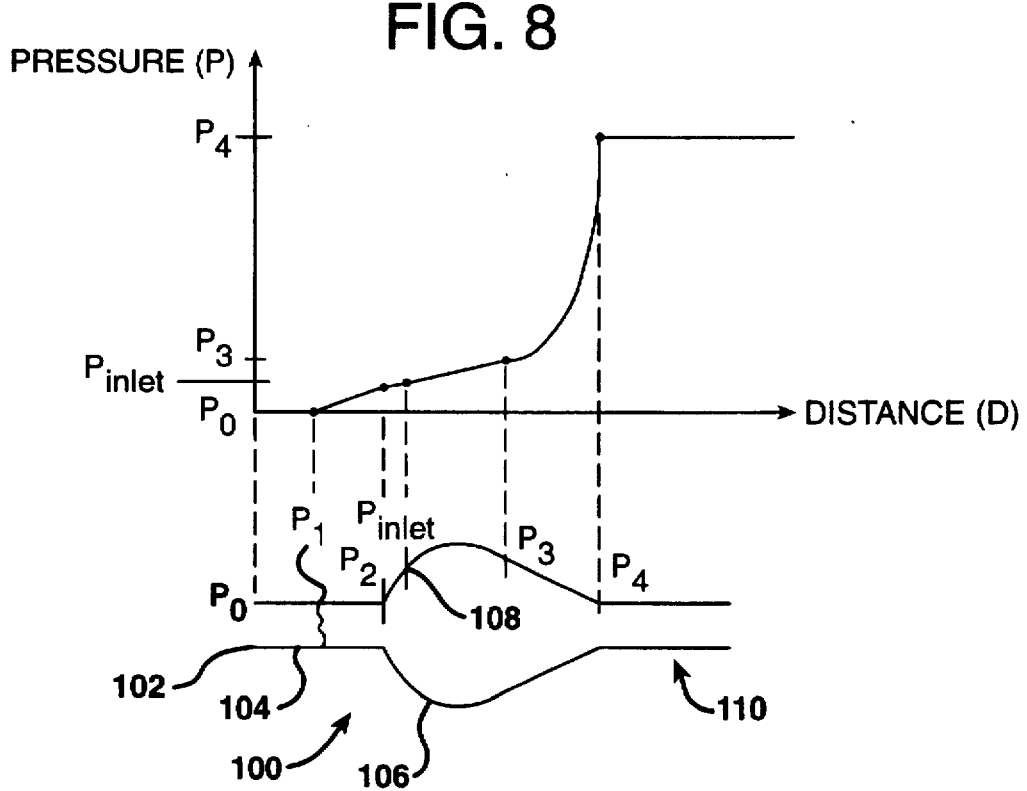
FIG. 8 is a schematic illustration of a prior art injection die with a corresponding example graphical representation of pressure within such an injection die versus distance from the entrance portion of the injection die.

Reference will now be made to the graphical representation of pressure within a prior art injection die 100 as shown in FIG. 8. As in FIG. 7, the graph is one of pressure within the die 100 versus distance from the inlet 102 of the die 100. As a reinforcement pack is drawn into the prior art die 100, the pressure is substantially atmospheric at $P_o$ and commences to increase at point $P_1$. The entry portion 104 of the prior art die 100 acts to initially compress the reinforcement pack to a pressure $P_2$ at which point the pack enters an injection cavity 106.

Resin is injected into the cavity 106 at an injection point 108 which is near the inlet of the cavity 106 and resin injection is performed at a pressure $P_{inlet}$ which is only slightly higher than the pressure $P_2$. Resin extends a distance into the entry portion 104 of the injection die 100 with the reinforcement pack serving to block further progress of the resin material injected at $P_{inlet}$ from escaping from the die. Due to the shape of the cavity 106, pressure within the cavity 106 of the prior art die 100 begins to rise from the pressure $P_{inlet}$.

As the resin and reinforcement pack are pulled into the tapered outlet end portion of the die 100 the pressure increases to a pressure $P_3$. The resin and reinforcement pack is then pulled through a quickly narrowing tapered portion of the cavity 106 wherein the pressure is rapidly increased to a pressure $P_4$. This final compression results in a relatively high pressure; however, there is no supply of resin at this high pressure and the time for impregnation is very small prior to entering the outlet end 110 of the injection die 100. Accordingly, the pack is not fully impregnated. The resin injection pressure cannot be increased since such increased pressure would overcome the pressure $P_2$ and result in the ejection of resin from the inlet 102 of the injection die 100.

Clearly then, the injection die 12 of the present invention provides a superior result to the injection die of the prior art. Air removal is enhanced and full impregnation is achieved. In addition, the injection die of the present invention reduces the emissions of VOCs over that of prior art resin bath processes by at least about 60% and more preferably by at least about 75%.

A method and apparatus for observing or monitoring resin injection pultrusion utilizing an injection die of the present application or other resin injection dies will now be described. The dynamics of resin injection pultrusion are complex and not easily observed in conventional injection dies which are made of opaque materials, typically metals. Thus, monitoring within the pultrusion processes, typically pressure monitoring, adjustments of reinforcement packs and the like followed by review of resulting pultruded products has been utilized to adjust the various parameters of the injection process including, for example, resin injection pressure, point of injection, resin viscosity, line speed and arrangement of the reinforcement pack being pultruded. Such prior art arrangements involve time consuming trial and error techniques. However, in accordance with the present application, by observing or monitoring the resin injection pultrusion process either directly or by means of imaging devices, the effects of adjustments of these various parameters of a resin injection process can be readily determined, and the parameters adjusted and optimized in a substantially reduced time.

Monitoring apparatus is schematically illustrated in FIG. 1, wherein there is seen the monitoring apparatus of the present invention. The monitoring apparatus 130a comprises an injection die, such as the injection die 12 as described above, which is provided with at least one portion 130 formed of a transparent material for monitoring the resin injection through the transparent portion. Preferably, the injection die 12 is provided with two transparent portions 130, 132 on opposing sides of the injection die 12. The transparent portion, such as either the transparent portion 130 or 132, may be formed in either a first wall, such as the first die body 16, a second wall, such as the second die body 18, or both first and second walls. In any event, the passage 120 of the injection die 12 may then be monitored or observed through the transparent portion or portions.

For example, resin injection can be observed or monitored to determine the extension of the resin zone 90 from the weir 53 toward the open end of the injection die 12. This enables selection of the injection pressure for formation of a proper resin zone. The forward edge of the resin zone 90 can also be observed to determine whether it is substantially even, as desired, or jagged. If a jagged front is observed on the resin zone, it will pinpoint areas of the reinforcement pack which may need to be adjusted to ensure proper impregnation without having resin ejected from the open end of the injection die 12.

As noted, the transparent portions 130, 132 are formed of a transparent material, preferably, such as a methyl acrylate plastic for example methyl methacrylic acid but may be formed of other transparent materials such as glass. The transparent portion or portions may comprise any portion of first and/or second die bodies, 16 and 18; however, preferably, is formed by making substantially the entire first and second die bodies, 16 and 18 of an appropriate transparent material. When transparent portions are included in both the first and second die bodies, 16 and 18, they are preferably opposite one another and in substantial alignment with each other.

When transparent portions are included in both the first and second die bodies, 16 and 18, an illuminating device 134 may be employed. The illuminating device 134, which may be a light bulb or any other appropriate device, illuminates the passage 120 through the transparent portion 132 in the second die body 18 as illustrated. Such illumination enables an observer to more clearly see the operation of the injection pultrusion process within the interior of the injection die 12.

To aid in monitoring the injection pultrusion process and to enable the creation of a permanent record, an imaging device 136 may be used opposite the transparent portion 130 in the first die body 16. The imaging device is preferably a camera for recording video or photographic-still images of the pultrusion injection process. In this fashion, the pultrusion injection process or resin injection may be observed and monitored either on-site or in remote locations.

Further, the recorded images may be subjected to a more thorough analysis than is possible with a visual observation. For example, video or still images could be correlated with sections of resulting pultruded product.

Accordingly, the present application also teaches a method and apparatus for monitoring an injection pultrusion or resin injection process of course, one of ordinary skill in the art will recognize that the method of monitoring comprises employing transparent material in an injection die, may be employed in most any injection die and is not limited to the specifically described injection die of the present application.

The injection die and method for resin injected pultrusion of the present application will now be illustrated by reference to several examples.

However, the method and apparatus of the present application is not intended to be limited to the specific, exemplary materials and conditions contained in the examples, but rather, may be practiced generally by the principles espoused below.

EXAMPLE 1

A flat fiberglass reinforced plate was pultruded through the apparatus of the present invention. The plate was formed from a multi-layer reinforcement pack. The pack comprised: a first ply of spun laced polyester veil available under the tradename 111-10 NEXUS veil from Precision Fabrics Group of Greensboro, N.C.; a second ply of 1 ounce continuous filament mat available under the designation M8643 from Owens-Corning of Toledo, Ohio; a third ply comprising 15 ends of 113 yield roving evenly spaced across the width of the ply and sold by Owens-Corning under the tradename 366 TYPE 30 roving; a fourth ply of the M8643 1 ounce continuous filament mat; a fifth ply comprising 15 ends of the 366 TYPE 30 113 yield roving; a sixth ply of M8643 1 ounce continuous filament mat; and a seventh ply of 111-10 Nexus veil.

The reinforcement pack was passed through the apparatus of the present invention at a linespeed of 13 inches per minute. A resin composition was supplied via a mixing pot under pressure. The resin comprised: 600 grams of isophthallicpolyester available under the designation E701 from Alpha-Owens-Corning of Colliersville, Tenn.; 60 grams of phosphate ester available under the tradename ZELAC-UN from E.I. DuPont de Neumors of Wilmington Del.; 100 grams of clay available under the tradename ASP 100 from Georgia Marble of Kennesaw, Ga.; 30 grams of peroxy dicarbonate available under the designation P16 from AKZO America, Inc. of Chicago, Ill.; and 15 grams of tertiarybutylperbenzoate available from AKZO America, Inc. of Chicago, Ill. The resin was injected into the weir of the injection die at a pressure of 60 psi. The curing die was heated to a flat rate temperature of 130° C. while the injection die was held at room temperature. The pressure 4 inches upstream from the weir was sensed at 25 psi. A flat plate 3 inches wide and 0.125 inches thick was produced. The plate had 53.5% glass by weight and a void content of 1%±1%.

EXAMPLE 2

A reinforcement pack was pultruded as in Example 1 at a linespeed of 32 inches per minute. A resin material substantially the same as in Example 1 was injected at a pressure of 95 psi. The only change in the resin was the substitution of 100 grams of clay available under the tradename HUBER H-35 from J. M. Huber Corp. of Ardmore, Okla. for the ASP 100 clay. The injection die was held at room temperature while the curing die had an entrance temperature of 130° C., a temperature at its center portion of 150° C. and an exit temperature of 160° C. The pressure 4 inches upstream from the weir was sensed at 25 psi. A flat plate 3 inches wide and 0.125 inches thick was produced. The plate had 53.5% glass and a void content of 1%±1%.

EXAMPLE 3

A reinforcement pack was pultruded as in Example 1 at a linespeed of 30 inches per minute. A resin comprising 8000 grams of the E701 isothallicpolyester, 55 grams of the ZELAC-UN phosphate ester, 80 grams of benzoyl peroxide commercially available from a number of sources and 150 grams of the HUBER H-35 clay was injected at a pressure of 105 psi. The injection die was held at room temperature while the curing die had the same temperature profile as in Example 2. The pressure 4 inches upstream from the weir was sensed at 25 psi. A flat plate 3 inches wide, 0.125 inches thick, having a void content of 1%±1% was produced.

EXAMPLE 4

A reinforcement pack comprising a first ply of 5½ inch wide 111-10 NEXUS veil, a 4½ inch wide second ply of M8643 1 oz continuous filament mat, a 4¼ inch wide third ply comprising 52 ends of roving sold by Owens-Corning under the tradename 366 TYPE 30 250 yield roving and 11 ends of 366 TYPE 30 113 yield roving each spread evenly across the width of the ply, a 3¾ inch wide fourth ply of the M8643 mat, a 4¼ inch wide fifth ply of 52 ends of the 366 TYPE 30 250 yield roving and 11 ends of 366 Type 30 113 yield roving, a 4½ inch sixth ply of the M8643 mat, and a 5½ inch wide 111-10 NEXUS veil was pultruded at 30 inches per minute through the apparatus of the present invention.

The reinforcement pack was pultruded as a U-shaped rail having dimensions of 1.904 inches for the overall width of the U, 1.198 inches for the overall height of the U, 0.190 inch for the width of each arm of the U, and 0.127 inch for the width of the central portion extending between the two arms of the U. A resin composition as in Example 2 was injected at a pressure of 80 psi. The final U-shaped rail had a glass content of 53% glass and a void content of 1%±1%.

Having described the invention in detail and by reference to the preferred embodiment thereof, it will be apparent that modifications and variations are possible without departing from the scope of the invention which is defined in the appended claims.

We claim:

1. An apparatus for resin injected pultrusion comprising:
   an injection die comprising:
   a first die body having an inlet end for receiving a pultrusion reinforcement pack and an outlet end for discharging said reinforcement pack;
   a second die body having an inlet end for receiving said pultrusion reinforcement pack and an outlet end for discharging said reinforcement pack, said first die body and said second die body being coupled to one another to define a passage therebetween extending from said inlet ends of said first and second die bodies to said outlet ends of said first and second die bodies;
   said first and second die bodies defining a resin injection weir channel positioned between their respective inlet ends and outlet ends;
   at least one of said first and second die bodies having at least one port for injecting resin into said weir channel;
   said passage including a tapered entrance portion extending from said inlet ends of said first and second bodies down to said weir channel and an exit portion extending from said weir channel to said outlet ends of said first and second die bodies, said entrance portion having an angle of about 1° or less; and
   injection apparatus communicating with said port for injecting resin into said weir channel to impregnate said reinforcement pack, said resin being injected at a sufficiently high pressure such that the pressure in said weir channel is substantially equal to or greater than a compression pressure applied by said exit portion to the impregnated reinforcement pack.

2. An apparatus for resin injected pultrusion as claimed in claim 1, further comprising a curing die sealingly associated with said injection die.

3. An apparatus for resin injected pultrusion as claimed in claim 1, further comprising a curing die integrally formed with said injection die.

4. An apparatus for resin injected pultrusion as claimed in claim 1, wherein said resin injection weir is shaped so as to create a uniform pressure profile across the injection die, thereby minimizing lateral motion of fibers in said reinforcement pack.

5. An apparatus for resin injected pultrusion as claimed in claim 4, wherein said weir is defined by a channel formed in at least one of said first die body and said second die body substantially perpendicularly to said passage.

6. An apparatus for resin injected pultrusion as claimed in claim 4, wherein said weir is defined by a channel formed in each of said first and second die bodies substantially perpendicular to said passage.

7. An apparatus for resin injected pultrusion as claimed in claim 1, wherein each of said first and second die bodies includes a port for injecting resin into said weir.

8. An apparatus for resin injected pultrusion as claimed in claim 1, wherein each of said first and second die bodies includes two or more ports for injecting resin into said weir.

9. An apparatus for resin injected pultrusion as claimed in claim 1, wherein said taper comprises an angle of about 0.5° or less.

10. An apparatus for resin injected pultrusion as claimed in claim 1, wherein said injection apparatus comprises a heating device for heating the resin before it is injected into said weir.

11. An apparatus for resin injected pultrusion as claimed in claim 1, wherein said injection apparatus includes a mixing head for mixing an uncatalyzed resin precursor and a catalyzed resin precursor to form a resin for injection into said weir.

12. An apparatus for resin injected pultrusion as claimed in claim 1, further comprising first and second shim rails for coupling said first and second die bodies to one another.

13. An apparatus as set forth in claim 1, wherein at least a portion of said first die body is formed from a transparent material.

14. An apparatus as set forth in claim 13, wherein at least a portion of said second die body is formed from a transparent material.

15. An apparatus for resin injected pultrusion comprising:
    an injection die comprising:
    a first die body having an inlet end for receiving a pultrusion reinforcement pack and an outlet end for discharging said reinforcement pack;
    a second die body having an inlet end for receiving said pultrusion reinforcement pack and an outlet end for discharging said reinforcement pack, said first die body and said second die body being coupled to one another to define a passage therebetween extending from said inlet ends of said first and second die bodies to said outlet ends of said first and second die bodies;

said first and second die bodies defining a resin injection weir channel positioned between their respective inlet ends and outlet ends;

at least one of said first and second die bodies having at least one port for injecting resin into said weir channel;

said passage including a tapered entrance portion extending from said inlet ends of said first and second bodies down to said weir channel and an exit portion extending from said weir channel to said outlet ends of said first and second die bodies, said tapered entrance portion having an angle of about 1° or less; and injection apparatus communicating with said port for injecting resin into said weir channel to impregnate said reinforcement pack.

16. An apparatus for resin injected pultrusion as claimed in claim 15, further comprising a curing die sealingly associated with said injection die.

17. An apparatus for resin injected pultrusion as claimed in claim 15, further comprising a curing die integrally formed with said injection die.

18. An apparatus for resin injected pultrusion as claimed in claim 15, wherein said tapered entrance portion has an angle of about 0.5° or less.

19. An apparatus as set forth in claim 15, wherein at least a portion of said first die body is formed from a transparent material.

20. An apparatus as set forth in claim 19, wherein at least a portion of said second die body is formed from a transparent material.

21. An apparatus for resin injected pultrusion comprising:
an injection die comprising:
a first die body having an inlet end for receiving a pultrusion reinforcement pack and an outlet end for discharging said reinforcement pack;
a second die body having an inlet end for receiving said pultrusion reinforcement pack and an outlet end for discharging said reinforcement pack, said first die body and said second die body being coupled to one another to define a passage therebetween extending from said inlet ends of said first and second die bodies to said outlet ends of said first and second die bodies;
said first and second die bodies defining a resin injection weir channel positioned between their respective inlet ends and outlet ends;
at least one of said first and second die bodies having at least one port for injecting resin into said weir channel;
said passage including a tapered entrance portion extending from said inlet ends of said first and second bodies down to said weir channel and an exit portion extending from said weir channel to said outlet ends of said first and second die bodies, said entrance portion having an angle of about 1° or less; and
injection apparatus communicating with said port for injecting resin into said weir channel to impregnate said reinforcement pack; and
a curing die coupled with said injection die.

* * * * *

UNITED STATES PATENT AND TRADEMARK OFFICE
CERTIFICATE OF CORRECTION

PATENT NO. : 5747075
DATED : May 5, 1998
INVENTOR(S) : Gauchel

It is certified that error appears in the above-identified patent and that said Letters Patent is hereby corrected as shown below:

On the title page: Item [54] and column 1 line 3,

Should read --Apparatus for Resin Impregnated Pultrusion--

Signed and Sealed this

First Day of September, 1998

Attest:

BRUCE LEHMAN

Attesting Officer

Commissioner of Patents and Trademarks